United States Patent
Kida et al.

(10) Patent No.: US 6,316,145 B1
(45) Date of Patent: Nov. 13, 2001

(54) NON-AQUEOUS ELECTROLYTE BATTERY AND CHARGING METHOD THEREFOR

(75) Inventors: Yoshinori Kida, Katano; Ryuji Ohshita, Neyagawa; Maruo Kamino, Katano; Seiji Yoshimura, Hirakata; Toshiyuki Nohma, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/308,622

(22) PCT Filed: Mar. 5, 1998

(86) PCT No.: PCT/JP98/00923

§ 371 Date: May 25, 1999

§ 102(e) Date: May 25, 1999

(87) PCT Pub. No.: WO98/40923

PCT Pub. Date: Sep. 17, 1998

(30) Foreign Application Priority Data

Mar. 10, 1997 (JP) ................................. 9-054451
Nov. 25, 1997 (JP) ................................. 9-323084

(51) Int. Cl.[7] ........................... H01M 4/58; H01M 4/50; H01M 6/14; H01M 6/18
(52) U.S. Cl. .................... 429/231.5; 429/218.1; 429/224; 429/231.1; 429/231.95; 429/303; 429/306
(58) Field of Search ................. 429/218.1, 224, 429/231.1, 231.95, 231.5, 303, 306

(56) References Cited

U.S. PATENT DOCUMENTS

| 5,464,708 | | 11/1995 | Neat et al. | 429/218 |
|---|---|---|---|---|
| 5,478,671 | * | 12/1995 | Idota | 429/194 |
| 5,478,674 | * | 12/1995 | Miyasaka | 429/218 |
| 5,506,075 | | 4/1996 | Iwasaki et al. | 429/218 |
| 5,571,637 | * | 11/1996 | Idota | 429/218 |
| 5,744,936 | * | 4/1998 | Kawakami | 320/120 |
| 5,766,796 | * | 6/1998 | Abraham et al. | 429/192 |
| 6,090,506 | * | 7/2000 | Inoue et al. | 429/232 |
| 6,114,064 | * | 9/2000 | Manev et al. | 429/224 |

FOREIGN PATENT DOCUMENTS

| 63-1708 | 6/1980 | (JP) . |
|---|---|---|
| 2-44660 | 2/1990 | (JP) . |
| 2-121276 | 5/1990 | (JP) . |
| 6-60867 | 3/1994 | (JP) . |
| 6-176758 | 8/1994 | (JP) . |
| 7-122298 | 5/1995 | (JP) . |
| 7-235291 | 9/1995 | (JP) . |
| 7-302587 | 11/1995 | (JP) . |
| 9-22734 | 1/1997 | (JP) . |
| 9-219215 | 8/1997 | (JP) . |

* cited by examiner

Primary Examiner—Steven P. Griffin
Assistant Examiner—Jonas N. Strickland
(74) Attorney, Agent, or Firm—Armstrong, Westerman, Hattori, McLeland & Naughton LLP

(57) ABSTRACT

In a non-aqueous electrolyte battery using titanium oxide or lithium titanate as a negative electrode material for negative electrode, polymeric electrolyte is interposed between the negative electrode and a positive electrode. If titanium oxide or lithium titanate is used as the negative electrode material for negative electrode and the polymeric electrolyte is interposed between the negative electrode and the positive electrode, the polymeric electrolyte is less liable to be decomposed by catalytic reduction induced by titanium oxide or lithium titanate. This prevents decline in the charge/discharge efficiency which occurs when a non-aqueous electrolyte solution is used. Thus, the non-aqueous electrolyte battery excellent in charge/discharge efficiency is provided.

7 Claims, 1 Drawing Sheet

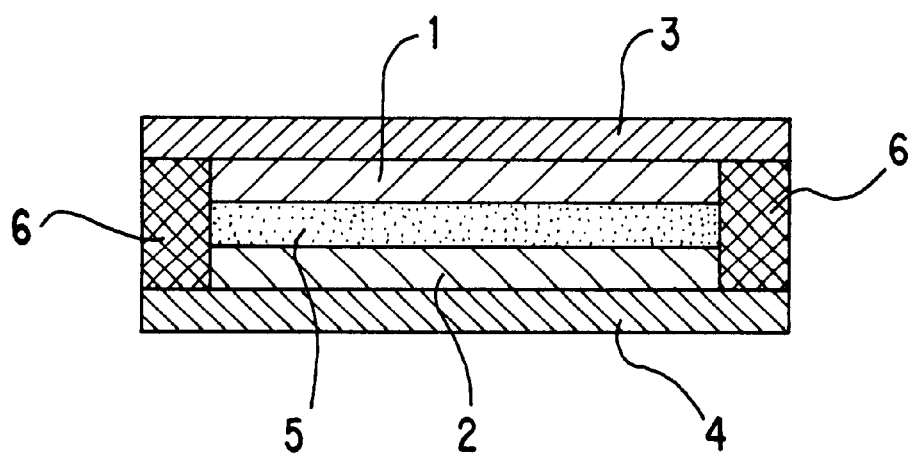

NON-AQUEOUS ELECTROLYTE BATTERY AND CHARGING METHOD THEREFOR

TECHNICAL FIELD

The present invention relates generally to a non-aqueous electrolyte battery including a positive electrode, a negative electrode, and a non-aqueous electrolyte. More particularly, the invention relates to a non-aqueous electrolyte battery and a charging method therefor characterized in that where titanium oxide or lithium titanate is used as a negative electrode material for negative electrode, a charge current is prevented from being partially consumed for the decomposition of the non-aqueous electrolyte thereby to ensure a high charge/discharge efficiency.

BACKGROUND ART

Recently, as one type of advanced batteries featuring high power and high energy density, non-aqueous electrolyte batteries of high electromotive force have been used. The non-aqueous electrolyte battery utilizes the non-aqueous electrolyte, such as a non-aqueous electrolyte solution, and a process of oxidation and reduction of lithium or the like.

Such a non-aqueous electrolyte battery has generally employed, as the negative electrode material for negative electrode, metallic lithium, lithium alloys such as a Li—Al alloy, a carbon material capable of intercalating/deintercalating lithium.

One problem encountered with the use of metallic lithium as the negative electrode material for negative electrode is that charging/discharging of the battery results in lithium dendrite growth on the negative electrode surface.

Where the lithium alloy such as Li—Al alloy is used as the negative electrode material for negative electrode, the dendrite growth does not occur. However, a low flexibility of the lithium alloy makes it difficult to fabricate a cylindrical battery wherein the negative electrode and the positive electrode, with a separator interposed therebetween, are wound into a roll.

Where the lithium alloy is used in a powdery form, a high reactivity of the lithium alloy results in a problem of difficult handling thereof. In addition, when a charge/discharge process is performed with such a lithium alloy used as the negative electrode, the charge/discharge process induces expansion/contraction of the lithium alloy, which produces a stress within the lithium alloy. This leads to another problem that the repeating of such charge/discharge processes causes destruction of the lithium alloy, resulting in capacity decline.

Where, on the other hand, the carbon material is used as the negative electrode material for negative electrode, the charge/discharge process causes less expansion/contraction of the carbon material than in the aforesaid case where the lithium alloy is used. However, some problems exist that the capacity of the carbon material is small than that of the lithium alloy and the initial charge/discharge efficiency is low.

Recently, there has been proposed, as in JP, 6-275263, A, the non-aqueous electrolyte battery which uses titanium oxide or lithium titanate as the negative electrode material for negative electrode together with a non-aqueous electrolyte solution, as the non-aqueous electrolyte, which solution is prepared by dissolving a lithium salt into a non-aqueous solvent.

Unfortunately, where titanium oxide or lithium titanate is used for the negative electrode in combination with the non-aqueous electrolyte solution prepared by dissolving the lithium salt into the non-aqueous solvent, a problem exists that the non-aqueous electrolyte solution is decomposed by a catalytic reduction induced by titanium oxide or lithium titanate contained in the negative electrode while the charge current is partially consumed for the decomposition of this non-aqueous electrolyte solution and hence, the charge/discharge efficiency is lowered.

In view of the foregoing, the invention is directed to solve the aforementioned problem encountered with the use of titanium oxide or lithium titanate as the negative electrode material for use in the negative electrode of the non-aqueous electrolyte battery including the positive electrode, the negative electrode and the non-aqueous electrolyte. An object of the invention is to provide a non-aqueous electrolyte battery which ensures a high charge/discharge efficiency by preventing the non-aqueous electrolyte from being decomposed by the catalytic reduction induced by titanium oxide or lithium titanate used for the negative electrode.

DISCLOSURE OF INVENTION

In accordance with the invention, a non-aqueous electrolyte battery using titanium oxide or lithium titanate as a negative electrode material for use in a negative electrode thereof is characterized in that a polymeric electrolyte is interposed between the negative electrode and a positive electrode.

If, as suggested by the invention, the polymeric electrolyte is interposed between the negative electrode and the positive electrode of the non-aqueous electrolyte battery using titanium oxide or lithium titanate as the negative electrode material for negative electrode, the polymeric electrolyte is less liable to be decomposed by the catalytic reduction induced by titanium oxide or lithium titanate in comparison with the conventional non-aqueous electrolyte solution. This avoids the problem suffered by the conventional non-aqueous electrolyte battery that the charge current is partially consumed for the decomposition of the non-aqueous electrolyte solution so as to lower the charge/discharge efficiency. Thus, the non-aqueous electrolyte battery featuring the high charge/discharge efficiency is provided.

It is to be noted here that the known titanium oxide and lithium titanate may be used as the negative electrode material for negative electrode. Examples of a usable negative electrode material include a rutile-type titanium oxide, an anatase-type titanium oxide, a spinel-type lithium titanate and the like. Above all, particularly preferred is the spinel-type lithium titanate featuring a layered structure, easy insertion/desertion of lithium ions and high charge/discharge efficiency.

In the non-aqueous electrolyte battery of the invention, the known positive electrode materials capable of intercalating/deintercalating lithium ions may be used as the positive electrode material for positive electrode. Examples of a usable positive electrode material include lithium-transition metal compound oxides containing at least one of manganese, cobalt, nickel, iron, vanadium and niobium. Above all, particularly preferred is manganese oxide containing lithium, which is less susceptible to ion deposition on titanium oxide or lithium titanate used for the negative electrode.

Where manganese oxide containing lithium is used as the positive electrode material, $LiMnO_2$ is preferably used for the purpose of easy fabrication of the battery whereas manganese dioxide containing $Li_2MnO_3$ is preferably used for the purpose of increasing the battery capacity. The aforesaid manganese dioxide containing $Li_2MnO_3$ may be obtained by heat-treating a mixture containing a lithium salt, such as lithium hydroxide, lithium nitrate, lithium phosphate, lithium carbonate, lithium acetate and the like, and manganese dioxide at temperatures in the range of between 300° C. and 430° C. The reason why the temperature for the heat treatment is limited within the range of between 300° C. and 430° C. is because $Li_2MnO_3$ is not preferably generated at temperatures of less than 300° C. whereas the decomposition of manganese dioxide takes place at temperatures of more than 430° C.

In the non-aqueous electrolyte battery according to the invention, the known polymeric electrolyte generally used in the art may be interposed between the positive electrode and the negative electrode. Examples of a usable polymeric electrolyte include polyethylene oxide, polypropylene oxide, cross-linked polyethylene glycol diacrylate, cross-linked polypropylene glycol diacrylate, cross-linked polyethylene glycol methyl ether acrylate, cross-linked polypropylene glycol methyl ether acrylate and the like.

Exemplary solutes to be added to the polymeric electrolyte include the known solutes generally used in the art, such as lithium compounds like lithium trifluoromethanesulfonate $LiCF_3SO_3$ lithium hexafluorophosphate $LiPF_6$, lithium perchlorate $LiClO_4$, lithium tetrafluoroborate $LiBF_4$, lithium trifluoromethanesulfonimide $LiN(CF_3SO_2)_2$.

When any one of the above solutes is added to the polymeric electrolyte, the solute dissolved in a solvent may be added. Exemplary solvents to be used include organic solvents such as propylene carbonate, ethylene carbonate, γ-butyrolactone, butylene carbonate, 1,2-dimethoxyethane, dimethyl carbonate, diethyl carbonate and the like. These solvents may be used alone or in combination of two or more types.

In the non-aqueous electrolyte battery according to the invention uses titanium oxide or lithium titanate for the negative electrode together with the aforesaid polymeric electrolyte as the non-aqueous electrolyte, as described above, the battery suffers less decomposition of the polymeric electrolyte not only in the normal charging process but also in such a charging process as uses a solar cell supplying high and unstable charge voltage. Thus, a sufficient charging is ensured even when the solar cell is used.

BRIEF DESCRIPTION OF DRAWINGS

The sole FIGURE is a schematic sectional view showing a construction of a non-aqueous electrolyte battery according to examples of the invention and comparative examples hereof.

BEST MODE FOR CARRYING OUT THE INVENTION

The non-aqueous electrolyte batteries according to the invention will be described in detail by way of examples hereof. Further, with reference to comparative examples, an explanation will be given to clarify that the non-aqueous electrolyte batteries of the invention achieve high charge/discharge efficiencies. It is to be understood that the non-aqueous electrolyte battery of the invention should not be limited to the following examples but changes and modifications may be made without departing from the scope of the invention.

EXAMPLE 1

In a non-aqueous electrolyte battery of Example 1, there were used a negative electrode, a positive electrode and a polymeric electrolyte, which were prepared in the following manner, thereby to fabricate a flat coin-type non-aqueous electrolyte battery having a thickness of 1 mm and a diameter of 20 mm, as shown in the FIGURE.

Preparation of Positive Electrode

In the preparation of the positive electrode, powdery $LiMnO_2$ was used as the positive electrode material. Powdery $LiMnO_2$, carbon as a conductive material and polytetrafluoroethylene as a binder were mixed together in a weight ratio of 90:6:4 so as to obtain a positive electrode mixture. The positive electrode mixture was subject to press-molding thereby to form a disk-like positive electrode.

Preparation of Negative Electrode

In the preparation of the negative electrode, powdery spinel-type lithium titanate $Li_4Ti_5O_{12}$ was used as the negative electrode material. Powdery $Li_4Ti_5O_{12}$, powdery carbon as the conductive material, and powdery polytetrafluoroethylene as the binder were mixed together in a weight ratio of 90:6:4 so as to obtain a negative electrode mixture. The negative electrode mixture was press-molded thereby to form a disk-like negative electrode.

Preparation of Polymeric Electrolyte

In the preparation of the polymeric electrolyte, polyethylene oxide (PEO) was heated to be melted, after which $LiPF_6$ was added in a concentration of 1 mol/l. The resultant mixture liquid was cured thereby to obtain a disk-like polymeric electrolyte.

Fabrication of Battery

In the fabrication of the battery, the positive electrode 1 thus prepared was attached to a positive electrode case 3 while the negative electrode 2 was attached to a negative electrode case 4. The aforesaid polymeric electrolyte 5 was sandwiched between the positive electrode 1 and the negative electrode 2 while the aforesaid positive electrode case 3 and negative electrode case 4 were electrically insulated from each other by an insulation packing 6. Thus, the coin-type non-aqueous electrolyte battery was obtained, as shown in the FIGURE.

EXAMPLE 2

In Example 2, the non-aqueous electrolyte battery was fabricated in the same manner as in the above Example 1, except for that rutile-type titanium oxide $TiO_2$ was used as the negative electrode material for negative electrode, as shown in the following table 1.

EXAMPLE 3

In Example 3, the non-aqueous electrolyte battery was fabricated in the same manner as in the above Example 1, except for that anatase-type titanium oxide $TiO_2$ was used as the negative electrode material for negative electrode, as shown in the following table 1.

EXAMPLE 4

In Example 4, the non-aqueous electrolyte battery was fabricated in the same manner as in the above Example 1, except for that powdery $LiCoO_2$ was used as the positive electrode material for positive electrode, as shown in the following table 1.

EXAMPLE 5

In Example 5, the positive electrode was prepared in the following manner. Manganese dioxide and lithium hydroxide, each having a mean particle size of not more than 30 μm, were mixed in a weight ratio of 80:20 in a mortar. Subsequently, the resultant mixture was heat treated in air at a temperature of 375° C. for 20 hours thereby to obtain manganese dioxide containing $Li_2MnO_3$.

Next, the resultant manganese dioxide containing $Li_2MnO_3$ was used as the positive electrode material for preparing the positive electrode in the same manner as in the above Example 1. Subsequently, using a lithium metal as a counter electrode for this positive electrode, the positive electrode was discharged to 2.2V (vs.Li/Li$^+$) at a constant potential in an electrolyte solution obtained by adding 1 mol/l $LiPF_6$ to a mixture solvent containing ethylene carbonate and diethyl carbonate in a volume ratio of 1:1.

In this example, the positive electrode thus discharged at the constant potential was used. On the other hand, as shown in the following table 1, the same spinel-type lithium titanate $Li_4Ti_5O_{12}$ as in Example 1 was used as the negative electrode material. The non-aqueous electrolyte battery of this example was fabricated in the same manner as in the above Example 1.

EXAMPLE 6

In Example 6, similarly to the above Example 5, used was the positive electrode which was prepared by using, as the positive electrode material, manganese dioxide containing $Li_2MnO_3$ shown in the following table 1 and which was discharged to 2.2V(vs.Li/Li$^+$) at the constant potential as described above. On the other hand, the same rutile type titanium oxide $TiO_2$ as in the above Example 2 was used as the negative electrode material. Except for these, the same procedure as in the above Example 1 was taken to fabricate the non-aqueous electrolyte battery.

EXAMPLE 7

In Example 7, similarly to the above Example 5, used was the positive electrode which was prepared by using, as the positive electrode material, manganese dioxide containing $Li_2MnO_3$ shown in the following table 1 and which was discharged to 2.2V(vs.Li/Li$^+$) at the constant potential. On the other hand, the same anatase-type titanium oxide $TiO_2$ as in the above Example 3 was used as the negative electrode material. Except for these, the same procedure as in the above Example 1 was taken to fabricate the non-aqueous electrolyte battery.

EXAMPLE 8

In Example 8, spinel-type $LiMn_2O_4$ shown in the following table 1 was used as the positive electrode material for preparing the positive electrode in the same manner as in the above Example 1. Subsequently, using the lithium metal as the counter electrode for this positive electrode, the positive electrode was discharged to 2.2V(vs.Li/li$^+$) at the constant potential in the electrolyte solution which was prepared by adding 1 mol/l $LiPF_6$ to the mixture solvent containing ethylene carbonate and diethyl carbonate in a volume ratio of 1:1.

In this example, the non-aqueous electrolyte battery was fabricated in the same manner as in the above Example 1, except for that the positive electrode thus discharged at the constant potential was used.

COMPARATIVE EXAMPLE 1

In Comparative Example 1, the positive electrode and the negative electrode were prepared in the same manner as in the above Example 1. On the other hand, the aforesaid polymeric electrolyte, as the non-aqueous electrolyte, was replaced by a non-aqueous electrolyte solution which was prepared by dissolving 1 mol/l $LiPF_6$ into a mixture solvent containing ethylene carbonate (EC) and 1,2-dimethoxyethane (DME) in a volume ratio of 1:1, as shown in the following table 1.

Then, the non-aqueous electrolyte battery was fabricated in the same manner as in the above Example 1, except for that a separator formed of a polypropylene porous film was interposed between the aforesaid positive electrode and negative electrode and was impregnated with the aforesaid non-aqueous electrolyte solution.

COMPARATIVE EXAMPLE 2

In Comparative Example 2, the non-aqueous electrolyte battery was fabricated in the same manner as in the above Example 1, except for that graphite was used as the negative electrode material for negative electrode, as shown in the following table 1.

COMPARATIVE EXAMPLE 3

In Comparative Example 3, the non-aqueous electrolyte battery was fabricated in the same manner as in the above Example 1, except for that powdery $LiCoO_2$ was used as the positive electrode material for positive electrode while graphite was used as the negative electrode material for negative electrode, as shown in the following table 1.

COMPARATIVE EXAMPLE 4

In Comparative Example 4, the non-aqueous electrolyte battery was fabricated in the same manner as in the above Example 1, except for that powdery $LiCoO_2$ was used as the positive electrode material for positive electrode while manganese dioxide $MnO_2$ was used as the negative electrode material for negative electrode, as shown in the following table 1.

COMPARATIVE EXAMPLE 5

In Comparative Example 5, used was the positive electrode which was prepared by using, as the positive electrode material, manganese dioxide containing $Li_2MnO_3$, as shown in the following table 1, and which was discharged to 2.2V (vs.Li/Li$^+$) at the constant potential. On the other hand, there were used powdery spinel-type lithium titanate $Li_4Ti_5O_{12}$ as the negative electrode material and the non-aqueous electrolyte solution as the non-aqueous electrolyte, similarly to the above Comparative Example 1, and thus was fabricated the non-aqueous electrolyte battery.

COMPARATIVE EXAMPLE 6

In Comparative Example 6, similarly to the above Example 5, there was used the positive electrode which was prepared by using, as the positive electrode material, manganese dioxide containing $Li_2MnO_3$ shown in the following table 1 and which was discharged to 2.2V (vs.Li/Li$^+$) at the constant potential as described above. On the other hand, the same graphite as in Comparative Example 2 was used as the negative electrode material. Except for these, the same procedure as in the above Example 1 was taken to fabricate the non-aqueous electrolyte battery.

Next, each of the non-aqueous electrolyte batteries of Examples 1 to 8 and of Comparative Examples 1 to 6 was charged for 8 hours at a charge current of about 1 mA/cm$^2$ from a solar cell disposed outdoors and thereafter, discharged at a discharge current of about 1 mA/cm² to a level 0.3V lower than a mean battery voltage thereof. Specifically, the non-aqueous electrolyte batteries of Examples 1 to 3, 5 to 8 and of Comparative Examples 1, 5 were discharged to 1.2V. The non-aqueous electrolyte battery of Example 4 was discharged to 1.8V. The non-aqueous electrolyte batteries of Comparative Examples 2,6 were discharged to 2.7V. The non-aqueous electrolyte battery of Comparative Example 3 was discharged to 3.3V whereas that of Comparative Example 4 was discharged to 0.3V. There were determined a quantity of electricity at the charging of each battery and a quantity of electricity at the discharging thereof, which quantities were used in the following equation for determination of a charge/discharge efficiency. The results are shown in the following table 1.

charge/discharge efficiency(%)=(quantity of electricity at discharging÷quantity of electricity at charging)×100

TABLE 1

|  | Positive Electrode Material | Negative Electrode Material | Electrolyte | Charge/ Discharge Efficiency |
|---|---|---|---|---|
| Example 1 | $LiMnO_2$ | $Li_4Ti_5O_{12}$ | Polymer | 98% |
| Example 2 | $LiMnO_2$ | Rutile-$TiO_2$ | Polymer | 93% |
| Example 3 | $LiMnO_2$ | Anatase-$TiO_2$ | Polymer | 91% |
| Example 4 | $LiCoO_2$ | $Li_4Ti_5O_{12}$ | Polymer | 97% |
| Example 5 | $MnO_2$ containing $Li_2MnO_3$ | $Li_4Ti_5O_{12}$ | Polymer | 98% |
| Example 6 | $MnO_2$ containing $Li_2MnO_3$ | Rutile-$TiO_2$ | Polymer | 94% |
| Example 7 | $MnO_2$ containing $Li_2MnO_3$ | Anatase-$TiO_2$ | Polymer | 92% |
| Example 8 | $LiMn_2O_4$ | $Li_4Ti_5O_{12}$ | Polymer | 96% |
| Comparative Example 1 | $LiMnO_2$ | $Li_4Ti_5O_{12}$ | Non-aqueous Electrolyte solution | 83% |
| Comparative Example 2 | $LiMnO_2$ | Graphite | Polymer | 83% |
| Comparative Example 3 | $LiCoO_2$ | Graphite | Polymer | 81% |
| Comparative Example 4 | $LiCoO_2$ | $MnO_2$ | Polymer | 85% |
| Comparative Example 5 | $MnO_2$ containing $Li_2MnO_3$ | $Li_4Ti_5O_{12}$ | Non-aqueous Electrolyte solution | 84% |
| Comparative Example 6 | $MnO_2$ containing $Li_2MnO_3$ | Graphite | Polymer | 85% |

As apparent from the results, the non-aqueous electrolyte batteries of Examples 1 to 8, which used titanium oxide or lithium titanate as the negative electrode material for negative electrode together with the polymeric electrolyte as the non-aqueous electrolyte, have all achieved much greater improvement in the charge/discharge efficiency than the non-aqueous electrolyte batteries of Comparative Examples 1, 5 which did not use the polymeric electrolyte and than the non-aqueous electrolyte batteries of Comparative Examples 2 to 4, 6 which used graphite or manganese dioxide instead of titanium oxide or lithium titanate as the negative electrode material for negative electrode.

As to the non-aqueous electrolyte batteries of Comparative Examples 2 to 4, 6 which used graphite or manganese dioxide for the negative electrode, it is believed that even if the polymeric electrolyte was used as the non-aqueous electrolyte, the polymeric electrolyte would be reduced by graphite or manganese dioxide to decrease the charge/ discharge efficiency.

According to a comparison among the non-aqueous electrolyte batteries of Examples 1 to 8, a notable increase in the charge/discharge efficiency was achieved by the use of spinel-type lithium titanate $Li_4Ti_5O_{12}$ as the negative electrode material for negative electrode. Additionally, the use of $LiMnO_2$ or manganese dioxide containing $Li_2MnO_3$ as the positive electrode material for positive electrode also contributed to the increase in the charge/discharge efficiency. The non-aqueous electrolyte batteries of Examples 1 and 5, which used the negative electrode material of spinel-type lithium titanate $Li_4Ti_5O_{12}$ in combination with the positive electrode material of $LiMnO_2$ or manganese dioxide containing $Li_2MnO_3$, presented the particularly increased charge/discharge efficiency.

Similarly to the foregoing, each of the non-aqueous electrolyte batteries of Examples 1 to 8 and of Comparative Examples 1 to 6 was charged for 8 hours at the charge current of about 1 mA/cm² from the solar cell and thereafter, discharged at the discharge current of about 1 mA/cm² to a level 0.3V below a mean battery voltage thereof. Specifically, the non-aqueous electrolyte batteries of Examples 1 to 3, 5 to 8 were discharged to 1.2V, and the non-aqueous electrolyte battery of Example 4 was discharged to 1.8V. Thus were determined respective battery capacities of the non-aqueous electrolyte batteries. The results are shown in the following table 2.

TABLE 2

| Example | 1 | 2 | 3 | 4 | 5 | 6 | 7 | 8 |
|---|---|---|---|---|---|---|---|---|
| Battery Capacity (mAh) | 9.1 | 7.8 | 7.5 | 8.5 | 10.2 | 9.2 | 8.7 | 9.1 |

It is apparent from the results that, where the non-aqueous electrolyte batteries using the same negative electrode material are compared, the batteries of Examples 5 to 7, which used the positive electrode material of manganese dioxide containing $Li_2MnO_3$ presented greater battery capacities than the non-aqueous electrolyte batteries of Examples 1 to 4, 8 which used the positive electrode material of $LiMno_2$, $LiCoO_2$ or spinel-type $LiMn_2O_4$.

Industrial Applicability

As described above, in the non-aqueous electrolyte battery according to the invention, which uses titanium oxide or lithium titanate as the negative electrode material for negative electrode, there is interposed the polymeric electrolyte, as the non-aqueous electrolyte, between the aforesaid negative electrode and the positive electrode. Therefore, this polymeric electrolyte, unlike the conventional non-aqueous electrolyte solution, is less liable to be decomposed by the catalytic reduction induced by titanium oxide or lithium titanate. Hence, the charge/discharge efficiency is prevented from being decreased by the partial consumption of the charge current. Thus, the non-aqueous electrolyte battery featuring high charge/discharge efficiency is obtained.

Further, according to the non-aqueous electrolyte battery of the invention, the use of spinel-type lithium titanate as the negative electrode material for negative electrode or the use of manganese oxide containing lithium as the positive electrode material for positive electrode provides the non-aqueous electrolyte battery further increased in the charge/ discharge efficiency.

Additionally, the non-aqueous electrolyte battery further increased in the battery capacity is provided by using manganese dioxide containing $Li_2MnO_3$ as the manganese oxide containing lithium to be used as the positive electrode material.

Further, the non-aqueous electrolyte battery according to the invention uses titanium oxide or lithium titanate for the negative electrode in combination with the polymeric electrolyte as the non-aqueous electrolyte, as described above, and therefore, the non-aqueous electrolyte battery suffers less decomposition of the polymeric electrolyte and the like even when it is used in combination with the solar cell supplying unstable and high charge voltage. Thus, the non-aqueous electrolyte battery ensures adequate charging even when it is used in combination with the solar cell.

What is claimed is:

1. A non-aqueous electrolyte battery comprising a negative electrode including lithium titanate with a spinel structure as a negative electrode material, a positive electrode including manganese dioxide containing $Li_2MnO_3$ as a positive electrode material, and a polymeric electrolyte interposed between said negative electrode and said positive electrode.

2. The non-aqueous electrolyte battery as claimed in claim 1, having a mean battery voltage thereof at the time of discharge of approximately 1.5V.

3. The non-aqueous electrolyte battery as claimed in claim 1, wherein said manganese dioxide containing $Li_2MnO_3$ used as said positive electrode material is obtained by heat-treating a mixture of manganese dioxide and a lithium salt at temperatures of between 300° C. and 430° C.

4. The non-aqueous electrolyte battery as claimed in claim 3, wherein said lithium salt is selected from a group consisting of lithium hydroxide, lithium nitrate, lithium phosphate, lithium carbonate, and lithium acetate.

5. A charging method for non-aqueous electrolyte battery, comprising providing a non-aqueous electrolyte battery comprising a negative electrode including lithium titanate with a spinel structure as a negative electrode material, a positive electrode including manganese dioxide containing $Li_2MnO_3$ as a positive electrode material and a polymeric electrolyte interposed between the negative electrode and the positive electrode, and charging said non-aqueous electrolyte battery with a solar cell.

6. The charging method for non-aqueous electrolyte battery as claimed in claim 5, wherein said manganese dioxide containing $Li_2MnO_3$ used as said positive electrode material in the non-aqueous electrolyte battery is obtained by heat-treating a mixture of manganese dioxide and a lithium salt at temperatures of between 300° C. and 430° C.

7. The charging method for non-aqueous electrolyte battery as claimed in claim 6, wherein said lithium salt is selected from a group consisting of lithium hydroxide, lithium nitrate, lithium phosphate, lithium carbonate, and lithium acetate.

* * * * *